United States Patent [19]

Kawata

[11] Patent Number: 5,410,690

[45] Date of Patent: Apr. 25, 1995

[54] SYSTEM FOR ISSUING PORTABLE STORAGE MEDIA CONTAINING COMMON AND INDIVIDUAL DATA

[75] Inventor: Miki Kawata, Yokohama, Japan

[73] Assignee: Kabushiki Kaisha Toshiba, Kawasaki, Japan

[21] Appl. No.: 113,518

[22] Filed: Aug. 30, 1993

Related U.S. Application Data

[63] Continuation of Ser. No. 619,490, Nov. 29, 1990, abandoned.

[30] Foreign Application Priority Data

Nov. 30, 1989 [JP] Japan .................. 1-311379

[51] Int. Cl.$^6$ ............................................ G06F 12/00
[52] U.S. Cl. .................... 395/600; 364/253.2; 364/253; 364/954.2; 364/246.3; 364/DIG. 1
[58] Field of Search .................. 395/800, 425, 600; 235/380

[56] References Cited

U.S. PATENT DOCUMENTS

| | | | |
|---|---|---|---|
| 4,614,861 | 9/1986 | Pavlov | 235/380 |
| 4,727,244 | 2/1988 | Nakano | 235/380 |
| 4,829,169 | 5/1989 | Watanabe | 235/492 |
| 4,868,376 | 9/1989 | Lessin | 235/492 |
| 4,912,308 | 3/1990 | Takahira | 235/379 |
| 4,965,802 | 10/1990 | Shinagawa | 371/51.1 |
| 5,012,074 | 4/1991 | Masada | 235/379 |

FOREIGN PATENT DOCUMENTS

0308183 9/1988 European Pat. Off. .

*Primary Examiner*—Eric Coleman
*Attorney, Agent, or Firm*—Cushman, Darby & Cushman

[57] ABSTRACT

An IC card issue system of the present invention issues IC cards, each having a data memory and a control element, to individuals by respectively writing, in the data memories of the respective portable storage media, issue data common to the individuals and issue data which differ individually. The system includes a storage section for storing an issue data file constituted by a common data group as a set of issue data common to each person, a personal data group as a set of issue data which differ individually, and attribute information. A read section for sequentially reading out the issue data from the common data group or from the personal data group in the storage section on the basis of discrimination signs in the attribute information stored in the storage section, and a write section for writing the issue data read out by the read section in the data memory of the IC card. Each of the discrimination signs represents that corresponding issue data is common data or personal data, and values each indicating a specific location of corresponding issue data in the common data group or in the personal data group.

25 Claims, 6 Drawing Sheets

SYSTEM FOR ISSUING PORTABLE STORAGE MEDIA CONTAINING COMMON AND INDIVIDUAL DATA

This is a continuation of application Ser. No. 07/619,490, filed on Nov. 29, 1990, which was abandoned upon the filing hereof.

BACKGROUND OF THE INVENTION

1. Field of the Invention

The present invention relates to an issue system for writing issue data in IC cards (portable storage media), which incorporate, for example, a CPU, data memory, and the like. Such issue data may include information associated with an IC card issuer and personal information associated with each IC card holder.

2. Description of the Related Art

When a portable storage medium such as an IC card is to be issued, issue data stored in an issue data file is written in it by an issue system. An issue data file used in such an operation is designed such that issue data is not discriminated as common data or personal data, and common data is repeatedly stored in the issue data file for each individual person.

As described above, the issue data file used in issue processing is designed such that common data is repeatedly stored for each individual person without discriminating issue data as common data or personal data. For this reason, especially when a ratio of common data to the total issue data is significantly high, the content of the issue data file is needlessly increased, and the real storage free area of the issue data file is undesirably reduced.

SUMMARY OF THE INVENTION

The present invention has been made to eliminate the above-described drawback that of a reduction in the free storage area of an issue data file due to the large amount of common data stored therein. It is an object of the present invention to provide a portable storage medium issue system which can avoid a great reduction in a free storage area of an issue data file due to common data.

According to the present invention, there is provided a portable storage medium issue system for issuing portable storage media, each having a data memory and a control element. The portable issue system operates by respectively writing, in the data memories of the respective portable storage media, issue data common to the individuals and issue data which differ individually and comprises:

a storage section for storing an issue data file constituted by a common data group as a set of issue data common to each person, personal data group as a set of issue data which differ individually, and attribute information including discrimination signs each representing that corresponding issue data is common data or personal data, and values each indicating a specific location of corresponding issue data in the common data group or in the personal data groups;

a read section for sequentially reading out the issue data from the common data group or from the personal data group in the storage section on the basis of the discrimination signs in the attribute information stored in the storage section; and a write section for writing the issue data read out by the read section in the data memory of each portable storage medium.

According to the present invention, portable storage media each having a data memory and a control element are issued to individuals by respectively writing, in the data memories of the respective portable storage media, issue data common to the individuals and issue data which differ individually. A storage section stores an issue data file constituted by a common data group as a set of issue data common to each person, a personal data groups as a set of issue data which differ individually, and attribute information including discrimination signs each representing that corresponding issue data is common data or personal data, and values each indicating a specific location of corresponding issue data in the common data group or in the personal data groups. The issue data are sequentially read out from the common data group or from the personal data groups in the storage section on the basis of the discrimination signs in the attribute information stored in the storage section. The readout issue data are respectively written in the data memory of the portable storage medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

An embodiment of the present invention will be described below with reference to the accompanying drawings.

Figure 1:
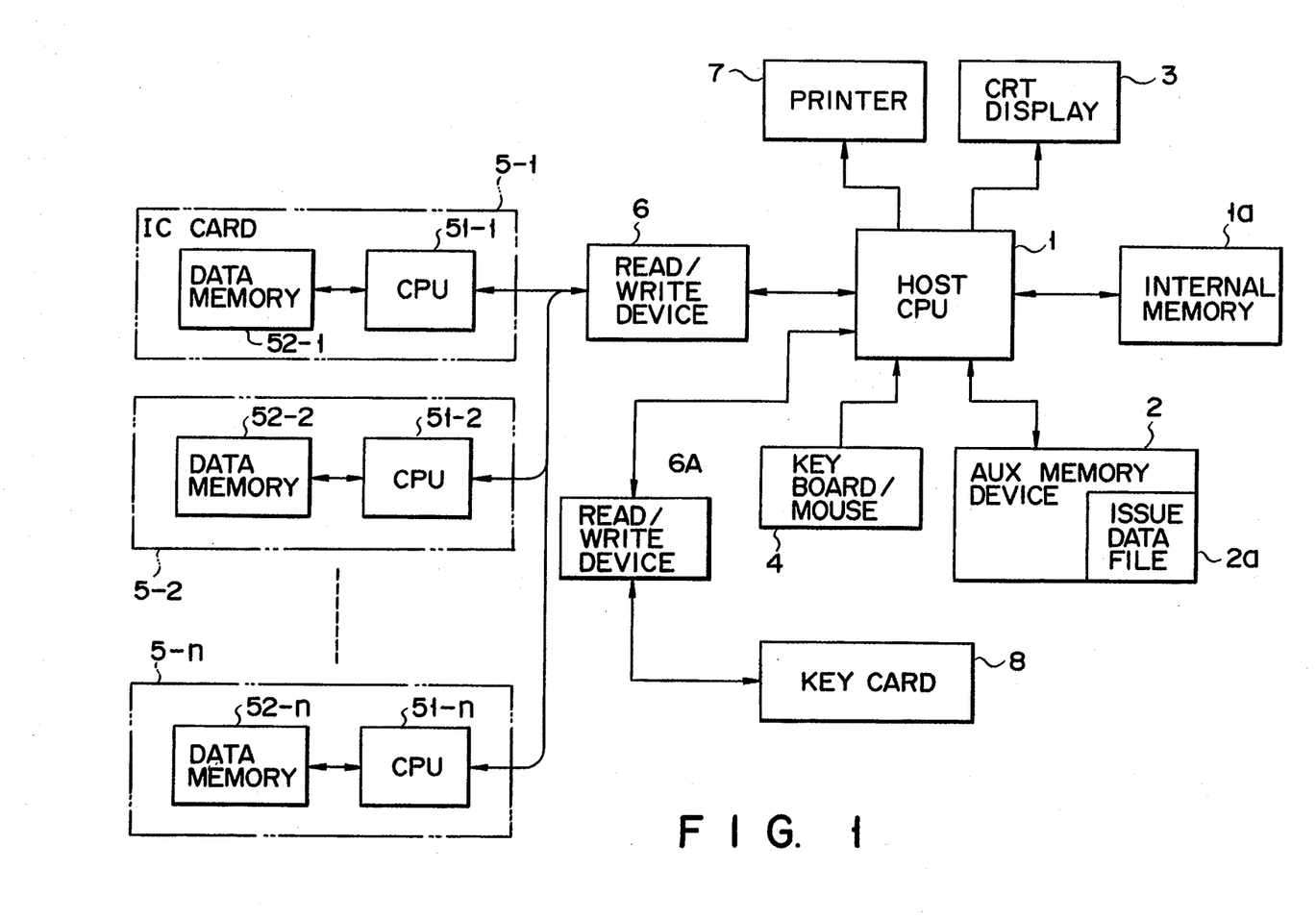
FIG. 1 is a block diagram showing an arrangement of an IC card issue system according to an embodiment of the present invention.

FIG. 1 shows an IC card issue system as an issue system for a portable storage medium according to the present invention. The IC card issue system comprises: host computer (host CPU) 1, having internal memory 1a, for controlling the overall system; auxiliary memory device (AUX memory device) 2 for storing a control program for controlling the issue system and issue data file 2a as processing contents of the system; CRT display 3 for displaying a sequence of operations of the issue system and an operation state to an operator; keyboard/mouse 4 as an input unit used to operate the system; read/write device 6 for writing issue data in IC cards 5 (5-1 to 5-n); printer 7 for printing out an issue record of IC cards, e.g., a date, issue data, a file name, card numbers, and the number of issue cards; key card 8 for storing an issuer key and a decode key; and read/write device 6A for performing read/write operations to key card 8. The issuer key serves as a password and is used to check whether or not a card to be issued is right one. The apparatus of FIG. 1 starts to operate only when the issuer key matches the password input from keyboard 4.

Figure 2:
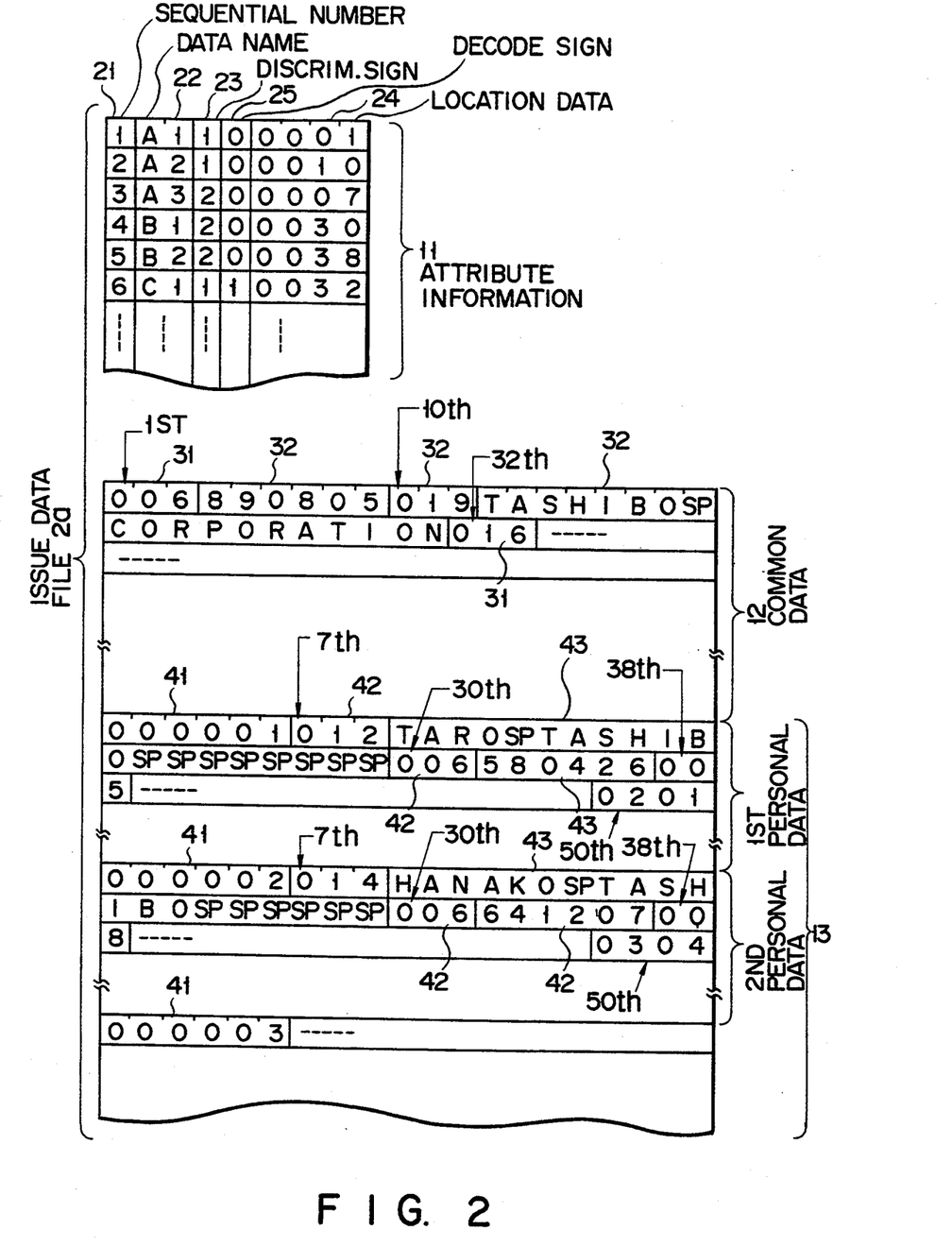
FIG. 2 is a view showing an issue data file to be stored in the system in FIG. 1.

Issue data file 2a consists of attribute information group 11, common data group 12, and personal data groups 13, as shown in FIG. 2. In attribute information group 11, pieces of the attribute information of all the issue data to be written in IC cards 5 are stored in the order of writing.

Each attribute information is constituted by a discrimination sign (discrimination sign) representing whether corresponding issue data is common data or personal data, and a value representing a specific location of corresponding issue data in common data group 12 or in personal data groups 13.

More specifically, attribute information group 11 is constituted by: storage area 21 for storing the sequential number of each issue data; storage area 22 for storing each data name; storage area 23 for storing each discrimination data representing whether corresponding issue data is common data or personal data; flag area 25 indicating whether or not a coded personal ID number (50th data in data groups 13) of each card is to be decoded; and storage area 24 for storing location data each representing a specific byte position of corresponding issue data in relation to the start byte position in common data group 12 or in personal data groups 13.

If "1" is stored as a discrimination sign in storage area 23, corresponding data in storage area 22 is common data. In contrast to this, if "2" is stored as a discrimination sign, corresponding data is personal data. When the flag bit in flag area 25 is "0", no decoding is performed, and when it is "1", decoding is performed. More specifically, when the flag bit in area 25 is "1", then the ID number of the 50th data in personal data groups 13 is decoded and written into IC card 5. The key used for this decoding is stored in key card 8, and is entered in internal memory 1a of CPU 1 after the password of key card 8 is verified.

In common data group 12, as issue data common to the respective persons (i.e., common to respective IC cards 5), issue machine numbers, issue company names, and the like. More specifically, common data group 12 is constituted by pairs of 3-byte storage areas 31, each for storing the actual data length of corresponding common data, and storage areas 32, each for storing corresponding common data.

In personal data groups 13, the names of persons and the like are stored as issue data which differ from person to person (i.e., from IC card 5 to IC card 5). More specifically, personal data groups 13 are each constituted by combinations of 6-byte storage area 41, each, each for storing the card number of corresponding IC card 5 issued for each person, 3-byte storage area 42, each, each for storing the actual data length of corresponding personal data, and storage area 43, each, each for storing corresponding personal data.

As shown in FIG. 1, each IC card 5 (5-1 to 5-n) is constituted by CPU (central processing unit) 51 (51-1 to 51-n), and data memory 52 (52-1 to 52-n) for storing the password of an issuer, issue data, and the like.

IC card issue processing of the present invention in the above-described arrangement will be described below with reference to flow charts shown in FIGS. 3A to 3C.

Figure 3A:
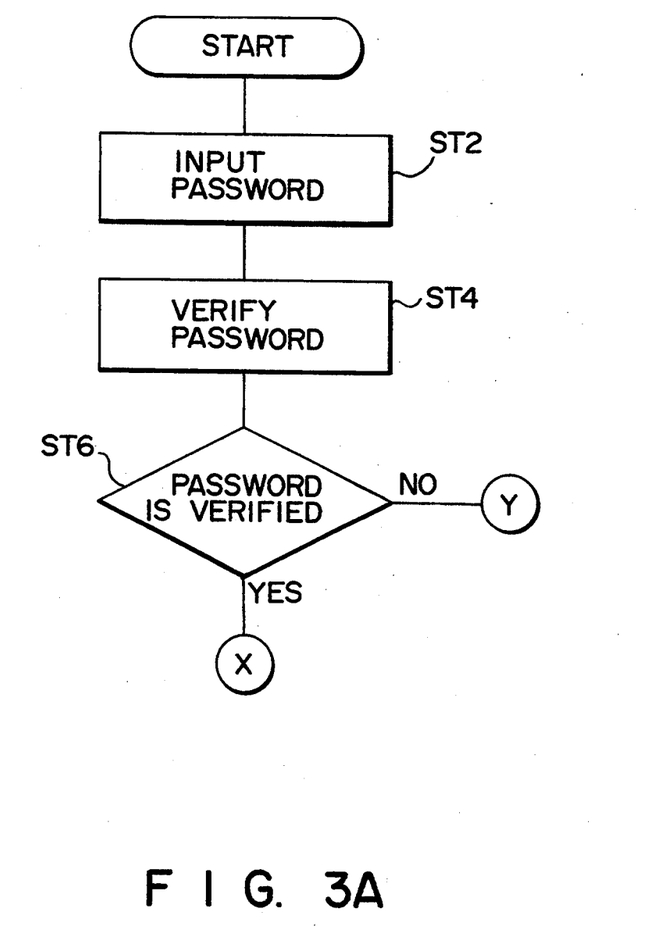
FIGS. 3A, 3B, 3C are flow charts for explaining an operation of the IC card issue system in FIG. 1.

First, a prescribed password is input from keyboard 4 (ST2 in FIG. 3A). CPU 1 compares the input password with the issuer key obtained from key card 8 in order to verify the password (ST4). If the password is not verified (no at ST6), then an error message is displayed at CRT display 3, and the operation stops. When the password is verified (yes at ST6), IC card issue processing starts (ST8 in FIG. 3B).

In accordance with instructions displayed on the CRT display 3, an operator inputs the file name of issue data to be issued, a start card number, and the number of issue cards by using keyboard 4 (ST10). These input data are stored in internal memory 1a in host CPU 1. Host CPU 1 checks whether input issue data file 2a exists in AUX memory device 2 (ST12). If the file is stored in AUX memory device 2 (YES in ST12), issue data file 2a is read out from AUX memory device 2 and is transferred to internal memory 1a.

Host CPU 1 checks whether cards, identified by the numbers from the input card number to the last card number which represents the sum of the input card number and the number of issue cards, exist in issue data file 2a (ST14). If they exist (YES in ST14), host CPU 1 causes CRT display 3 to display an insertion request of IC card 5.

In response to this request, the operator inserts IC card 5 (e.g., 5-1) in a card insertion slot (not shown) of read/write device 6 (ST16). Host CPU 1 then outputs the input password of the issuer to CPU 51 in IC card 5 through read/write device 6. CPU 51 (51-1) in IC card 5 (5-1) collates the issuer key from memory 1a of host CPU 1 with the password stored in data memory 52 (52-1) (ST18). CPU 51 sends the collation result to host CPU 1 through read/write device 6.

If the sent collation result represents that the issuer key is verified (YES in ST20), host CPU 1 causes internal memory 1a to store attribute information group 11 in issue data file 2a stored in AUX memory device 2 (ST22).

By using the distribute information of the first issue data in distribute information group 11, host CPU 1 checks whether the issue data is common data or personal data and determines a specific storage position of the data in common data group 12 or in personal data groups 13 (ST24). Issue data is read out from issue data file 2a in accordance with these determination results (ST26). The readout issue data is output to CPU 51 in IC card 5 through read/write device 6. With this operation, the issue data from host CPU 1 is stored in data memory 52 by CPU 51 in IC card 5 (ST32).

If "1" is stored as a discrimination sign in storage area 23 in attribute information (YES in ST24), host CPU 1 determines that corresponding issue data is common data. In this case, host CPU 1 reads out succeeding issue data by an actual data length read out from storage area 31 located at a position indicated by location data of storage area 24 in common data group 12 (ST26). Host CPU 1 then outputs the readout issue data to CPU 51 in IC card 5 through read/write device 6. CPU 51 in IC card 5 stores the issue data from host CPU 1, i.e., common data, in data memory 52. If a discrimination sign in storage area 23 is not "1" (NO in ST24), host CPU 1 checks whether corresponding issue data is personal data. If the data is personal data (YES in ST28), host CPU 1 determines the storage position of the data in common data group 12 or personal data groups 13 on the basis of location data 24. Issue data read out from issue data file 2a in accordance with these determination results is output to CPU 51 in IC card 5 through read/write device 6. With this operation, the issue data from host CPU 1 is stored in data memory 52 by CPU 51 in IC card 5 (ST32).

Processing for the third issue data (discrimination sign: "2") in attribute information group 11 is performed in the following manner. If "2" is stored as a discrimination sign in storage area 23 in attribute information (NO in step 24; YES in ST28), host CPU 1 determines that corresponding issue data is personal data. In this case, host CPU 1 reads out succeeding issue data, i.e., personal data having start card number n0 (e.g., 000001) as its header in personal data groups 13 of issue data file 2a by an actual data length read out from storage area 42 located at a position indicated by location data (0007) of storage area 24 (ST30). The readout issue data is output to CPU 51 in IC card 5 through read/write device 6. With this operation, CPU 51 in IC card 5 causes data memory 52 to store the issue data (i.e., the personal data) from host CPU 1 (ST32).

Subsequently, host CPU 1 sequentially reads out issue data from common data group 12 or from personal data groups 13 by using attribute information (23, 24), of issue data, in attribute information group 11, and performs processing of the readout data in the same manner as described above (NO in ST34; ST36).

If writing for all issue data belonging to start card number n0 (YES in ST34), i.e., writing for issue data with respect to all the attribute information in attribute information group 11 is completed, IC card 5 is ejected from read/write device 6 (ST38). At this time, host CPU 1 requests insertion of IC card 5 having the next number (e.g., 000002) by using CRT display 3. In response to this request, IC card 5 is inserted in the card insertion slot (not shown) of read/write device 6, and processing is performed in the same manner as described above (NO in ST40; ST42), thereby storing all corresponding issue data in data memory 52 (52-1 to 52-n) in each IC card 5 (5-1 to 5-n).

After n IC cards 5 (5-1 to 5-n) corresponding to the input number of issue cards are issued in this manner, host CPU 1 causes printer 7 to print out an issue record constituted by an issue date, an issue data file name, card numbers of issue data, and the number of issue cards.

Figure 3B:
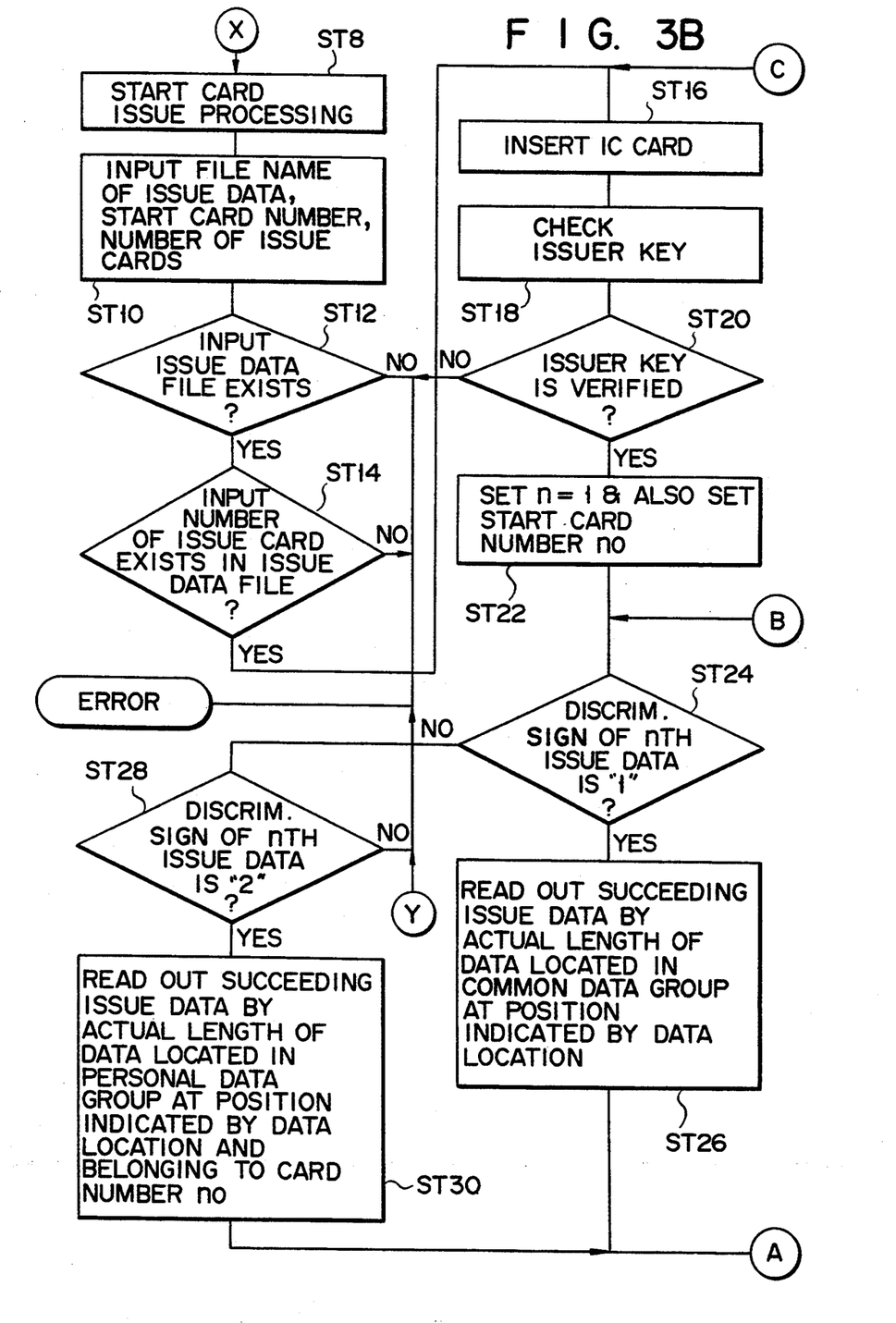
Figure 3C:
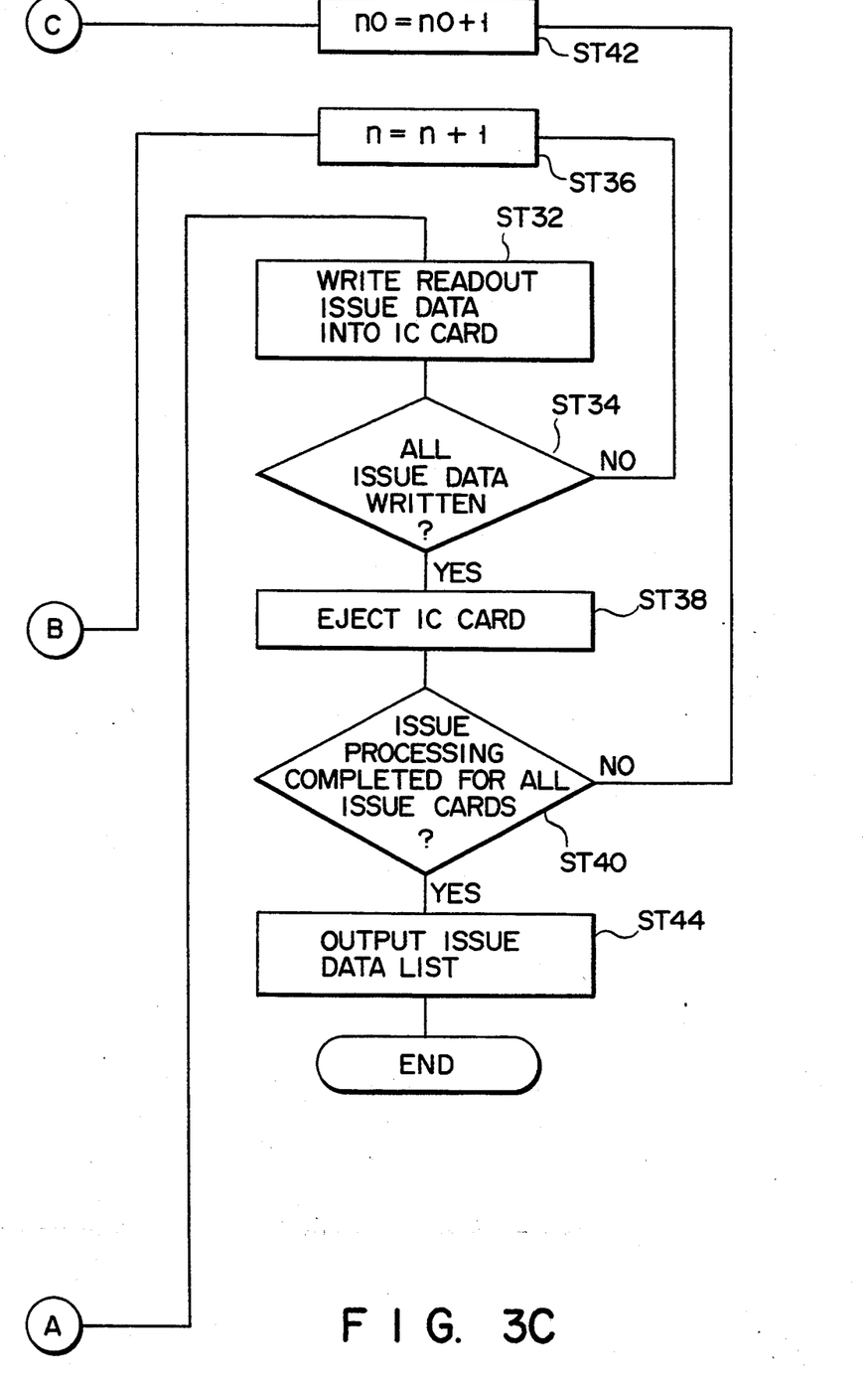

Note that if an error is caused (NO in ST12, ST14, ST20, or ST28) during the processing in FIGS. 3A to 3C, an error message is displayed on CRT display 3 to stop or interrupt the processing.

Figure 4:
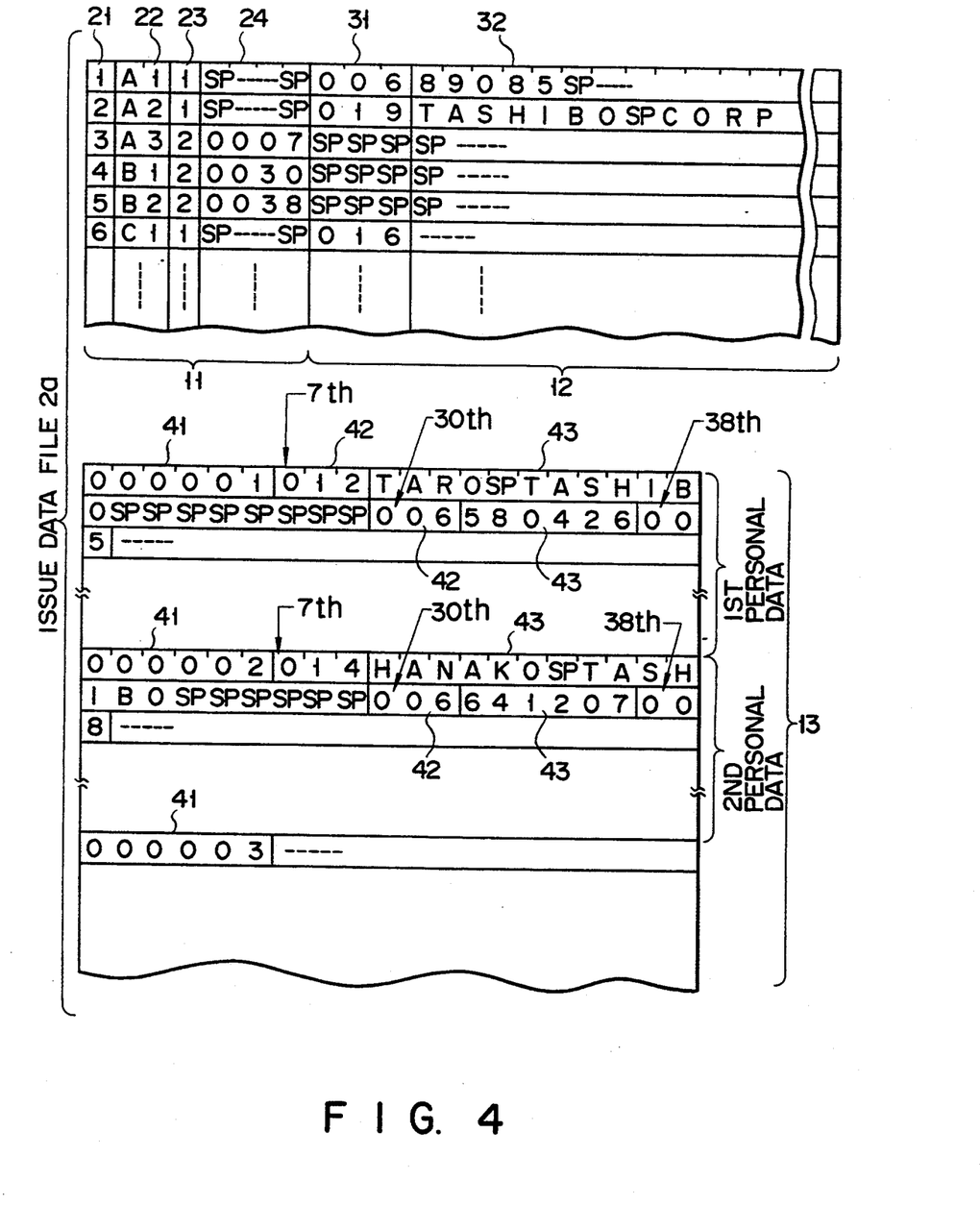
FIG. 4 is a view showing another issue data file to be stored in the system in FIG. 1.

Since attribute information group 11 may be considered as common data, an issue data file may have an arrangement shown in FIG. 4. More specifically, a portion after storage area 24 of each data location is set to be common data area (fixed length). In this arrangement, if issue data is common data, the common data is stored together with its actual data length. At this time, a 6-byte space is stored in storage area 24 of the data location. With this operation, attribute information group 11 and common data group 12 are linked to each other.

If issue data is personal data, the data is stored in personal data groups 13, in the same manner as described with reference to FIG. 2.

As described above, in the system for issuing IC cards by storing issue data in the IC cards by using an issue data file stored in the auxiliary memory device, since data common to the respective IC cards to be issued is stored in the issue data file by an amount corresponding to one IC card, common data need not be stored for the respective IC cards in the issue data file. For this reason, the capacity of an issue data file can be reduced compared with that for the same number of IC cards to be issued in the prior art. Therefore, the real storage area of an issue data file can be effectively used, and the storage capacity of the above-mentioned auxiliary memory device can be effectively used.

In the above-described embodiment, an IC card is used as a portable storage medium. However, the present invention is not limited to this, and other media, such as a laser card, having a data memory and a control element, for selectively and externally performing input/output operations may be used. In addition, the shape of a storage medium is not limited to a card-like shape, and storage media having other shapes such as a rod-like shape may be employed.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An apparatus for writing issue data, including common data and personal data, to IC cards having a memory for storing said personal and common data, and for issuing said IC cards, comprising:

means for storing an issue data file including i) a common data memory section for storing common data which is common to each of the cards, said common data memory section having a memory limited in size to an amount of said common data to be stored in the memory one of said IC cards ii) a personal data memory section for storing personal data and card numbers which are specific respectively to each of the cards, and iii) a location data memory section for storing location information which indicates a location of the stored common data and the stored personal data;

means for designating each of said cards with said respective card numbers;

first reading means for reading the location information for the stored common data and personal data from the issue data file;

second reading means for reading the stored common data and personal data from the issue data file based on said location information read by the first reading means;

third reading means for reading from the issue data file the stored personal data for one of the cards having a specified card number designated by the designating means;

means for writing the respective common data and the personal data, as read by the second and third reading means, to the memory of said one of the cards; and means for recording the specified card number of said one of the cards to which the common data and the personal data are written by the writing means.

2. The apparatus of claim 1, further comprising: means for detecting that the personal data for a specified card number designated by the designating means is stored in the issue data file.

3. The apparatus of claim 1, further comprising:

means for specifying a card number of a first card to be issued;

means for temporarily storing the card number specified by the specifying means;

means for incrementing a content of the temporarily storing means after the apparatus issues the first card to be issued; and means for reading the personal data of a subsequent card having a card number represented by the content of the temporarily storing means after said incrementing means increments the content of the temporarily storing means.

4. The apparatus of claim 3, further comprising:

means for setting a number of cards to be issued; and means for detecting that the number of cards to be issued, as set by the setting means, has issued.

5. The apparatus of claim 4, wherein the detecting means counts said number of cards to be issued starting from the card number specified by the specifying means, said detecting means being operable to stop said apparatus from issuing more cards.

6. The apparatus of claim 5, wherein the common data memory section of the storing means includes a plurality of memory locations for storing the common data, said personal data memory section includes a plurality of memory locations for storing the personal data, and said location data memory section stores (a) an order in which a number of pieces of data is written to the cards, (b) a discrimination sign which discriminates whether a specific piece of data within said number of pieces of data is stored in the common data memory section or the personal data memory section, and (c) location data which indicates whether the specific piece of data is stored in the common data memory section or the personal data memory section.

7. The apparatus of claim 6, wherein said first reading means includes means for reading the discrimination sign and the location data, said second reading means includes means for reading the common data based on the location data when the discrimination sign indicates that said specific piece of data is stored in the common data memory, and said third reading means includes means for reading the personal data based on the location data when the discrimination sign indicates that said specific piece of data is stored in the personal data memory.

8. The apparatus of claim 6, further comprising:

means for detecting that all of said number of pieces of data have been written to the cards.

9. An IC card issuing system for writing issue data to IC cards having a memory for storing said issue data, said system comprising:

means for writing common data, which is common to each of said IC cards, and personal data, including a card number, which is specific to each of said cards, to the memory of said IC cards;

an issue data file including i) a common data memory section for storing said common data, said common data memory section having a memory limited in size to an amount of said common data to be stored in the memory one of said IC cards ii) a personal data memory section for storing said personal data, and iii) a location data memory section for storing location information which indicates the location of the stored common data and the stored personal data;

first reading means for reading the location information for the stored common data and personal data from the location data memory section:

second reading means for reading the stored common data from the common data memory section based on the location information:

third reading means for reading from the issue data file the stored personal data based on the location information read by the first reading means; and a writing device for writing the common data and the personal data, read by the second and third reading means, to at least one of said cards.

10. The system of claim 9, further comprising:

means for detecting that the personal data for a specific card number designated by the designating means is stored in the issue data file.

11. The system of claim 9, further comprising:

means for specifying a card number for a first card to be issued;

means for temporarily storing the card number specified by the specifying means;

means for incrementing a content of the temporarily storing means after the system issues the first card to be issued; and means for reading the personal data of a subsequent card having a card number represented by the content of the temporarily storing means after said incrementing means increments the content of the temporarily storing means.

12. The system of claim 11, further comprising:

means for setting a number of cards to be issued; and means for detecting that the number of the cards to be issued, a set by the setting means, has issued.

13. The system of claim 12, wherein the detecting means counts said number of cards to be issued starting from the card number specified by the specifying means, said detecting means being operable to stop said system from issuing more cards.

14. The system of claim 13, wherein the common data memory section of the storing means includes a plurality of memory locations for storing the common data, said personal data memory section includes a plurality of memory locations for storing the personal data, said location data memory section stores (a) an order in which a number of pieces of data is written to the cards, (b) a discrimination sign which discriminates whether a specific piece of data within said number of pieces of data is stored in the common data memory section or the personal data memory section, and (c) location data which indicates whether the specific piece of data is stored in the common data memory section or the personal data memory section.

15. The system of claim 14, wherein said first reading means includes means for reading the discrimination sign and the location data, said second reading means includes means for reading the common data based on the location data when the discrimination sign indicates that said specific piece of data is stored in the common data memory, and said third reading means includes means for reading the personal data based on the location data when the discrimination sign indicates that said specific piece of data is stored in the personal data memory.

16. The system of claim 14, further comprising:

means for detecting that all of said number of pieces of data have been written to the cards.

17. A method of issuing IC cards each having a memory, comprising the steps of:

a first step of forming an issue data file including i) a common data memory section for storing common data which is common to each of the cards, said common data memory section having a memory limited in size to an amount of said common data to be stored in the memory one of said IC cards ii) a personal data memory section for storing personal data and card numbers which are specific respectively to each of the cards, and iii) a location data memory section for storing location information which indicates a location of the stored common data and the stored personal data;

a second step of designating the cards with said respective card numbers;

a third step of reading the location information for the stored common data and the stored personal data from the issue data file;

a fourth step of reading from the issue data file the stored common data based on the location information read in said third step;

a fifth step of reading from the issue data file the stored personal data for one of the cards, having a specified card number designated in the second step, based on the location information read by the third step;

a sixth step of writing the respective common data and the personal data read in the fifth step to the memory of said one of the cards; and a seventh step of detecting when all data to be written to the memory of said one of the cards is complete.

18. The method of claim 17, wherein the second step includes a step of specifying a number of cards to be issued, said method further comprising:

an eighth step of repeating said second step to said seventh step until the specified number of cards has issued.

19. A method of claim 17, further comprising:

a step of detecting that the personal data for a card having a specified card number designated in the second step is stored in the issue data file.

20. A method according to claim 17, wherein the sixth step of writing the respective common data is accomplished by a writing device, and further comprising an eighth step of ejecting said one of the IC cards from the writing device after the seventh step.

21. The method of claim 17, further comprising:

a step of setting a number of the cards to be issued; and a step of detecting that the number of cards to be issued has been issued.

22. The method of claim 21, further comprising:

a step of stopping the issuance of cards when the number of cards to be issued has issued.

23. The method of claim 22, wherein the common data memory section of the issue data file includes a plurality of memory locations for storing the common data, said personal data memory section includes a plurality of memory locations for storing the personal data, and said location data memory section stores (a) an order in which a number of pieces of data is written to the cards, (b) a discrimination sign which discriminates whether a specific piece of data within said number of pieces of data is stored in the common data memory section or the personal data memory section, and (c) location data which indicates whether the specific piece of data is stored in the common data memory section or the personal data memory section.

24. The method of claim 23, wherein the third step includes a step of reading the discrimination sign and the location data, said fourth step includes a step of reading the common data based on the location data when the discrimination sign indicates that said specific piece of data is stored in the common data memory, and said fifth step includes a step of reading the personal data based on the location data when the discrimination sign indicates that said specific piece of data is stored in the personal data memory.

25. The method of claim 23, further comprising:

a step of detecting that all of said number of pieces of data has been written to the cards.

* * * * *